United States Patent
Ueda et al.

(10) Patent No.: US 8,513,918 B2
(45) Date of Patent: Aug. 20, 2013

(54) VEHICLE BATTERY CONTROL SYSTEM HAVING A VOLTAGE SENSOR THAT MEASURES A VOLTAGE BETWEEN A CONTACTOR AND AN INVERTER EQUIPMENT

(75) Inventors: Masahiro Ueda, Hitachinaka (JP); Yoshinori Aoshima, Tsukubamirai (JP)

(73) Assignees: Hitachi, Ltd., Tokyo (JP); Hitachi Vehicle Energy, Ltd., Hitachinaka-shi (JP)

( * ) Notice: Subject to any disclaimer, the term of this patent is extended or adjusted under 35 U.S.C. 154(b) by 344 days.

(21) Appl. No.: 12/762,735

(22) Filed: Apr. 19, 2010

(65) Prior Publication Data

US 2010/0264878 A1    Oct. 21, 2010

(30) Foreign Application Priority Data

Apr. 20, 2009   (JP) ................. 2009-101667

(51) Int. Cl.
*H02J 7/00*    (2006.01)
(52) U.S. Cl.
USPC .......................................... 320/116
(58) Field of Classification Search
USPC .......................................... 320/116
See application file for complete search history.

(56) References Cited

U.S. PATENT DOCUMENTS 5,994,789 A * 11/1999 Ochiai ................... 307/10.1
2008/0048617 A1* 2/2008 Yoshida ................. 320/132

FOREIGN PATENT DOCUMENTS

| JP | 2003-180003 A | 6/2003 |
| JP | 2003-243044 A | 8/2003 |
| JP | 2008-312391 A | 12/2008 |
| JP | 2009-081958 A | 4/2009 |

OTHER PUBLICATIONS

Notification of Reasons for Refusal dated Jun. 4, 2013 in related Japanese Patent Application No. 2009-101667.

* cited by examiner

*Primary Examiner* — Arun Williams
(74) *Attorney, Agent, or Firm* — Crowell & Moring LLP

(57) ABSTRACT

A vehicle battery control system includes: a battery module that is constituted with a plurality of cells that are connected in series; a cell controller that detects each voltage at the plurality of cells; and a battery control unit that detects a total voltage of the battery module based on a signal from a voltage sensor disposed between a contactor connected to the battery module and an inverter equipment connected to the contactor and calculates a battery state of the battery module based upon the detected total voltage. And the battery control unit calculates the battery state based upon a total value of voltages at the plurality of cells detected by the cell controller in place of the total voltage when the contactor is in an open state.

4 Claims, 5 Drawing Sheets

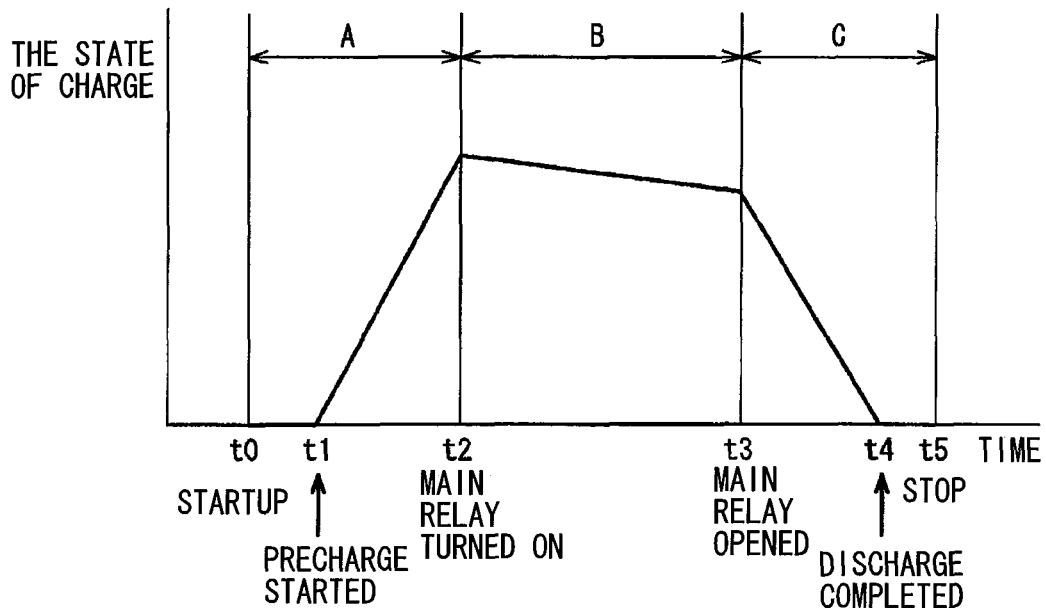
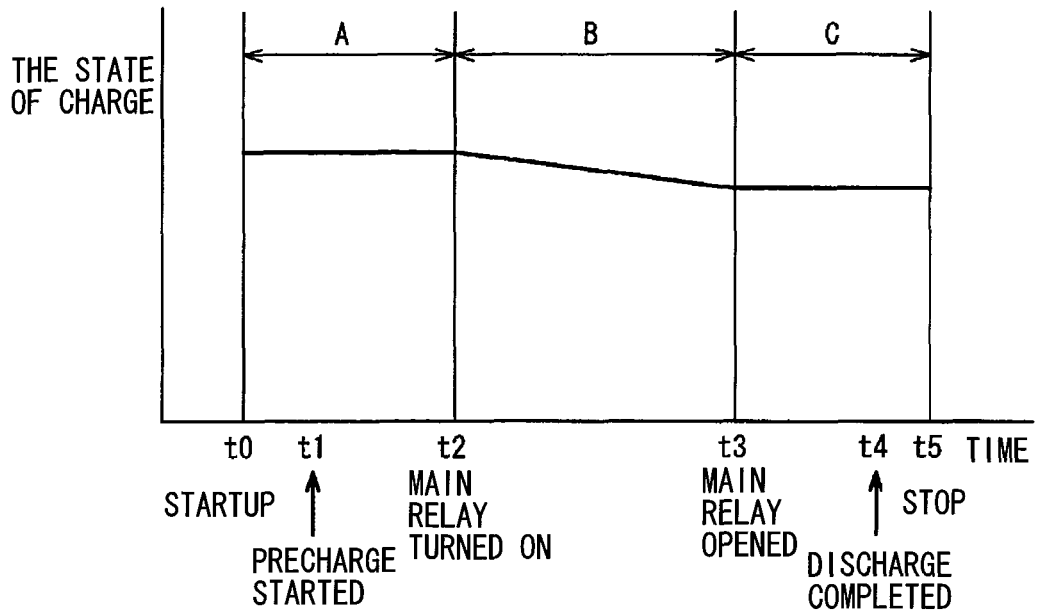

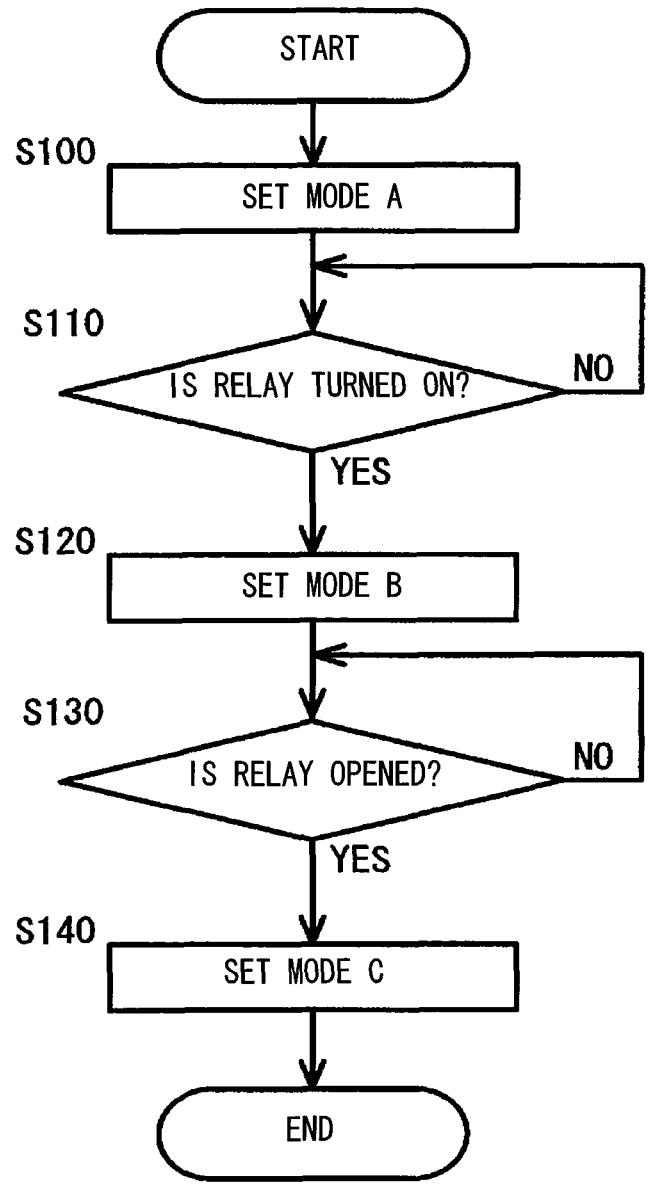

VEHICLE BATTERY CONTROL SYSTEM HAVING A VOLTAGE SENSOR THAT MEASURES A VOLTAGE BETWEEN A CONTACTOR AND AN INVERTER EQUIPMENT

INCORPORATION BY REFERENCE

The disclosure of the following priority application is herein incorporated by reference: Japanese Patent Application No. 2009-101667 filed Apr. 20, 2009.

BACKGROUND OF THE INVENTION

1. Field of the Invention

The present invention relates to a vehicle battery control system.

2. Description of Related Art

Recently, development and commercialization of a system that is driven using inputtable/outputtable electric power information from a battery controller as it travels such as a vehicle equipped with a hybrid system using a battery and an electric vehicle have been advanced. These vehicles use the battery based upon information of the state of charge, the inputtable/outputtable electric power, and the like from the battery controller. The state of charge and the inputtable/outputtable electric power of the battery are calculated based upon information having been input via a variety of sensors such as a voltage sensor.

SUMMARY OF THE INVENTION

Output of the sensor information may produce different results depending upon the vehicle configuration and the operating state of the battery controller. For example, a relay circuit is provided between the battery and an inverter. In the event that a voltage sensor is disposed in an electric power line between the relay circuit and the inverter, there has been an issue yet to be addressed effectively in that the voltage at the battery can not be measured in a state in which the relay circuit is opened and that the correct voltage can not be measured due to a smoothing capacitor provided on the inverter side.

According to the 1st aspect of the present invention, a vehicle battery control system comprises: a battery module that is constituted with a plurality of cells that are connected in series; a cell controller that detects each voltage at the plurality of cells; and a battery control unit that detects a total voltage of the battery module based on a signal from a voltage sensor disposed between a contactor connected to the battery module and an inverter equipment connected to the contactor and calculates a battery state of the battery module based upon the detected total voltage calculates a battery state of the battery module based upon the detected total voltage. And the battery control unit calculates the battery state based upon a total value of voltages at the plurality of cells detected by the cell controller in place of the total voltage when the contactor is in an open state.

According to the 2nd aspect of the present invention, in the vehicle battery control system according to the 1st aspect, it is preferred that: the inverter equipment includes a smoothing capacitor that is connected in parallel with input terminals; and a preliminary charge period of the smoothing capacitor is included in a period of the open state.

According to the 3rd aspect of the present invention, in the vehicle battery control system according to the 1st aspect, it is preferred that: the vehicle battery control system further comprises a storage device that stores the voltages of the cells detected by the cell controller or the total value of the voltages of the cells just before the contactor is closed when the vehicle battery control system is stopped; and the battery control unit calculates the battery state based upon the voltages or the total values of the voltages stored in the storage device when the vehicle battery control system is started up.

According to the 4th aspect of the present invention, in the vehicle battery control system according to the 2nd aspect, it is preferred that: the vehicle battery control system further comprises a storage device that stores the voltages of the cells detected by the cell controller or the total value of the voltages of the cells just before the contactor is closed when the vehicle battery control system is stopped; and the battery control unit calculates the battery state based upon the voltages or the total values of the voltages stored in the storage device when the vehicle battery control system is started up.

BRIEF DESCRIPTION OF THE DRAWINGS

FIGS. 2A and 2B schematically illustrate changes in the state of charge from startup to stop of the device. FIG. 2A shows a conventional case, while FIG. 2B shows the case achieved in the present embodiment.

FIG. 3 is a flowchart explaining a mode switching operation.

DESCRIPTION OF PREFERRED EMBODIMENTS

Figure 1:
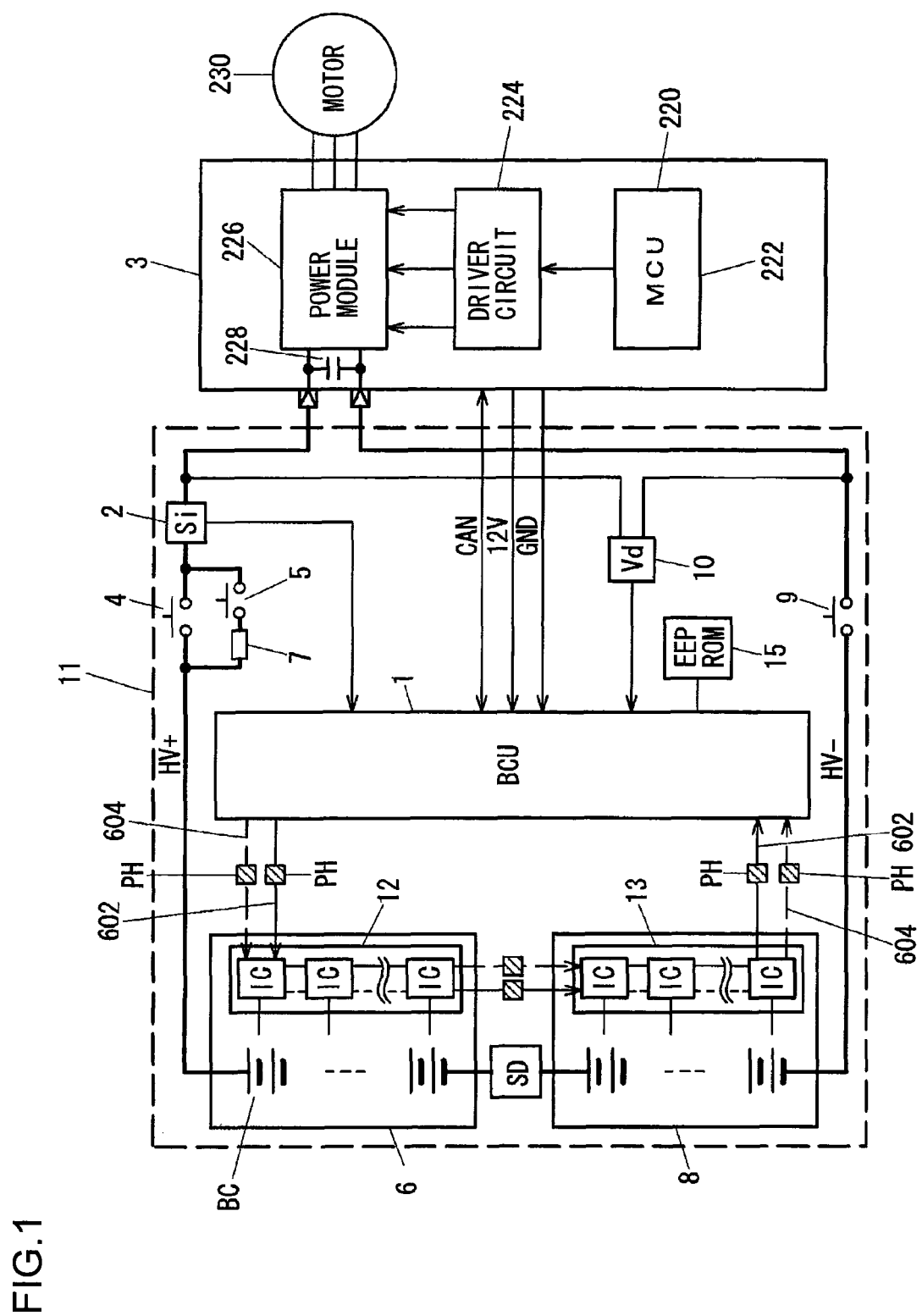
FIG. 1 is a diagram showing the vehicle battery control system according to the present embodiment.

An embodiment of the present invention will now be explained with reference to figures. FIG. 1 is a diagram showing the vehicle battery control system according to the present embodiment. The drive system shown in FIG. 1 includes a battery control system 11, an inverter equipment 3 that converts DC power from the battery control system 11 into three-phase AC power, and a motor 230 for driving the vehicle. The motor 230 is driven by three-phase AC power from the inverter equipment 3.

The inverter equipment 3 includes a power module 226, an MCU 222, a driver circuit 224 for driving the power module 226, and a smoothing capacitor 228. The power module 226 converts DC power supplied from the battery control system 11 into three-phase AC power for driving the motor 230. The smoothing capacitor 228, being provided between power lines HV+ and HV− to be connected to the power module 226, works to reduce voltage noise applied to the integrated circuits described later provided in the battery control system 11. A large capacity capacitor, for instance, approximately 700 μF to approximately 2000 μF is used for the smoothing capacitor 228.

The battery control system 11 includes battery modules 6 and 8 that are constituted with a plurality of cells BC connected in series, a battery control unit (hereinafter referred to as BCU) 1 that controls the battery modules 6 and 8, an electric current sensor 2, a voltage sensor 10, cell controllers 12 and 13, main relays 4 and 9, and a sub relay 5.

The plurality of cells BC provided in each of the battery modules 6 and 8 are each divided into a plurality of battery groups, and, corresponding to the battery groups, a plurality of integrated circuits (IC) are provided in the cell controllers 12 and 13. Each of the integrated circuits primarily executes voltage measurement of the cells BC, capacity adjustment for achieving uniformity with regard to variation in charge amount at the cells BC, and the like. The battery modules 6 and 8 are connected in series via a service disconnect SD that is constituted by serially connecting a switch and a fuse and is installed for purposes of maintenance/inspection.

A daisy chain type serial communication system 602 and a one-bit communication system 604 are provided between each of the integrated circuits and the BCU 1. In the communication system 602, a command requesting voltage measurement, capacity adjustment, and the like is transmitted from the BCU 1 to each of the integrated circuits and upon request measurement voltage or the like is transmitted from each of the integrated circuits to the BCU 1. In the one-bit communication system 604, over-charge detection information that informs that the cells BC are in an over-charge state is transmitted from the integrated circuits to the BCU 1. The communication systems 602 and 604 are provided with an insulation element PH such as a photocoupler.

The BCU 1 executes instruction and data passing between the BCU 1 and the inverter equipment 3 in a communication method such as CAN (controller area network). The inverter equipment 3 performs CAN communication with a vehicle-side controller (not shown in the figure), which is a higher-order controller, and receives from the vehicle-side controller a drive instruction related to the motor 230 and information related to a vehicle state. In the battery control system 11, peripheral circuits such as the BCU 1 start operation upon application of a 12V power source from the inverter 3 to the BCU 1.

The main relays 4 and 9 are provided in the power lines HV+ and HV− between the battery modules 6 and 8 and the inverter equipment 3. A series circuit constituted with the sub relay 5 and a resistor 7 is connected in parallel with the main relay 4. The electric current sensor 2 measures power current and sends the measurement result to the BCU 1. The voltage sensor 10 measures the voltage between the power lines HV+ and HV− between the main relays 4 and 9 and the inverter equipment 3, i.e., the total voltage at the plurality of cells BC provided in the battery modules 6 and 8, and send the measurement result to the BCU 1. Based upon information from the electric current sensor 2, the voltage sensor 10, and the like, the BCU 1 performs a calculation of the battery state (the state of charge, inputtable/outputtable electric power, and the like) and notifies the inverter 3 of the calculation result via a communication.

When braking the vehicle, the inverter equipment 3 controls the phase of the AC power generated at the power module 226 relative to the rotor of the motor 230 and engages the motor 230 in operation as a generator. In other words, the inverter equipment 3 executes regenerative braking control so as to charge the battery modules 6 and 8 with the power regenerated through generator operation. If the state of charge at the battery modules 6 and 8 becomes lower than the reference level, the inverter equipment 3 engages the motor 230 in operation as a power generator. The three-phase AC power generated at the motor 230 is converted to DC power via the power module 226 and the DC power resulting from the conversion is then supplied to the battery modules 6 and 8. As a result, the battery modules 6 and 8 are charged.

At the start of operation of the inverter equipment 3, the smoothing capacitor 228 holds substantially no electrical charge and, as the main relays 4 and 9 are closed, a large initial current starts to flow in to the smoothing capacitor 228. Therefore, the main relay 4 may become fused due to the large current. In order to prevent this, upon issuance of a high voltage output request from the inverter 3 to the BCU 1, the sub relay 5 and the main relay 9 are closed and the smoothing capacitor 228 is precharged. Since the voltage sensor 10 can measure the voltage at the smoothing capacitor 228 even if the main relay 4 is in the open state, the main relay 4 is turned on and the sub relay 5 is opened if the measured voltage increases to approximately 80 to 90% of the battery modules 6 and 8.

Under this relay operation, the relay circuit is effectively protected and the maximum current that may flow through the cells BC and the inverter equipment 3 is regulated so as not to exceed a predetermined value, thereby assuring a high level of safety.

When the main relay 4 is turned on, the BCU 1 notifies the inverter 3 of completion of turning on the relay. In addition, upon receiving a battery use stop instruction from the inverter 3, the BCU 1 opens the main relays 4 and 9 and stops the high-voltage supply to the inverter 3.

(Integrated Circuits)

Figure 4:
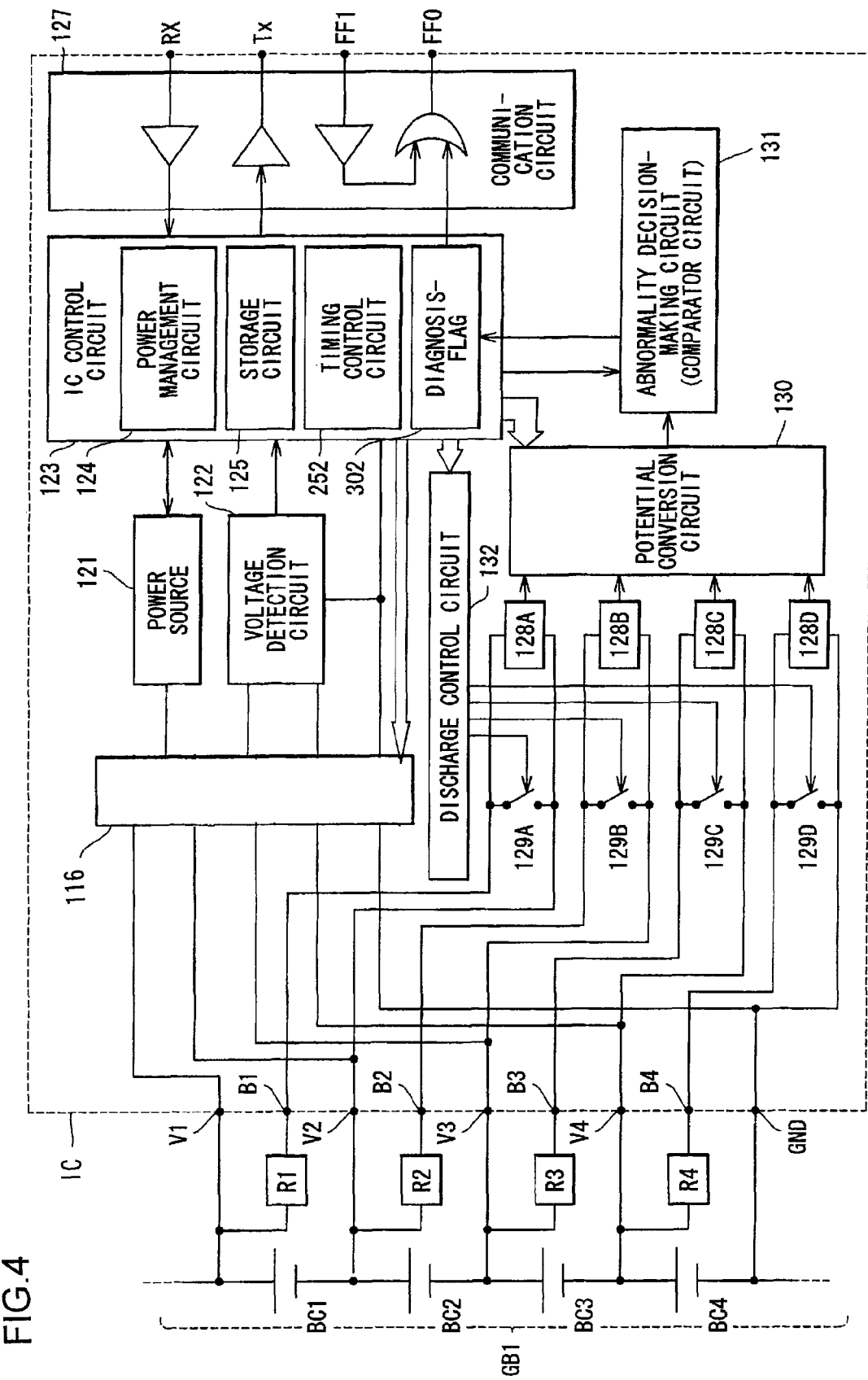
FIG. 4 is a block diagram showing the integrated circuit IC in detail.

FIG. 4 is a block diagram of an electronic circuit representing an example of the integrated circuits provided at the cell controllers 12 and 13. The integrated circuit IC shown in FIG. 4 represents the uppermost integrated circuit IC at the cell controller 12, and the other integrated circuits IC adopt structures identical to one another. The plurality of cells BC provided at the battery module 6 are grouped into a plurality of cell groups GB1 and GB2 and . . . respectively corresponding to a plurality of integrated circuits IC provided at the cell controller 12. In FIG. 4, four cells BC1 to BC4, which constitute the cell group GB1, are connected to the integrated circuit IC.

Input-side terminals V1 to V4 and a GND terminal of the integrated circuit IC are connected to the cells BC1 to BC4 constituting the cell group GB1. The positive-pole terminal of the cell BC1 is connected to an input circuit 116 via the input terminal V1. The input circuit 116 includes a multiplexer. The negative-pole terminal of the cell BC1, which is also the positive-pole of the cell BC2, is connected to the input circuit 116 via the input terminal V2. The negative-pole terminal of the cell BC2, which is also the positive-pole of the cell BC3, is connected to the input circuit 116 via the input terminal V3. The negative-pole terminal of the cell BC3, which is also the positive-pole of the cell BC4, is connected to the input circuit 116 via the input terminal V4. The negative-pole terminal of the cell BC4 is connected to the GND terminal of the integrated circuit IC.

The power source circuit 121, which may be constituted with, for instance, a DC/DC converter, converts power from the individual cells BC1 to BC4 to predetermined constant voltages. These voltages are supplied to the various circuits within the integrated circuit IC to be used as drive power or supplied to a comparator circuit where it is used as a comparison reference voltage when judging the current state.

The voltage detection circuit 122 includes a circuit that converts the terminal voltage at each of the cells BC1 to BC4 to a digital value. The terminal voltages having been converted to digital values are provided to an IC control circuit 123 where they are held in an internal storage circuit 125. These voltage values are used in the diagnosis and the like and are also transmitted to the BCU 1 shown in FIG. 1 from a communication circuit 127.

The IC control circuit 123, equipped with an arithmetic operation function, includes the storage circuit 125, a power management circuit 124 and a timing control circuit 252 that cyclically detects various voltages and executes a state diagnosis. The timing control circuit 252 generates a control signal (a timing signal) to be used to manage the overall operation of the integrated circuit IC. In the storage circuit 125, which may be constituted with, for instance, a register circuit, the terminal voltages at the cells BC1 to BC4 detected by the voltage detection circuit 122 are stored in correspondence to the individual cells BC1 to BC4. In addition, other detection values are held in the storage circuit 125 at predetermined addresses so that they can be read out as necessary. The power management circuit 124 assumes a structure that enables it to manage the state of the power source circuit 121.

The communication circuit 127 is connected to the IC control circuit 123 and thus, the IC control circuit 123 is able to receive a signal originating from an external sender outside the integrated circuit IC via the communication circuit 127. For instance, the communication command originating from the BCU 1 can be received at the RX terminal via the photo-coupler PH. The communication command is then transferred from the communication circuit 127 to the IC control circuit 123, and is decoded at the IC control circuit 125, which then executes processing corresponding to the contents of the communication command. Such a communication command may be a communication command requesting the measurement values indicating the terminal voltages at the cells BC1 to BC4, a communication command requesting a discharge operation to be executed in order to adjust the states of charge at the individual cells BC1 to BC4, a communication command (wake-up) for starting operation of the integrated circuit IC, a communication command (sleep) for stopping operation of the integrated circuit IC or a communication command requesting address setting.

Resistors R1 to R4 are state of charge adjustment resistors to be used to individually adjust the states of charge at the cells BC1 to BC4. The positive-pole terminal of the cell BC1 is connected to a terminal B1 of the integrated circuit IC via the resistor R1. A balancing switch 129A is disposed between the terminal B1 and the terminal V2. An operating state detection circuit 128A that detects the operating state of the balancing switch 129A is connected in parallel to the balancing switch 129A. A discharge control circuit 132 executes open/close control for the balancing switch 129A. Likewise, the positive-pole terminal of the cell BC2 is connected to a terminal B2 via the resistor R2 and a balancing switch 129B is disposed between the terminal B2 and the terminal V3. An operating state detection circuit 128B that detects the operating state of the balancing switch 129B is connected in parallel to the balancing switch 129B. A discharge control circuit 132 executes open/close control for the balancing switch 129B.

The positive-pole terminal of the cell BC3 is connected to a terminal B3 via the resistor R3 and a balancing switch 129C is disposed between the terminal B3 and the terminal V4. An operating state detection circuit 128C that detects the operating state of the balancing switch 129C is connected in parallel to the balancing switch 129C. The discharge control circuit 132 executes open/close control for the balancing switch 129C. The positive-pole terminal of the cell BC4 is connected to a terminal B4 via the resistor R4 and a balancing switch 129D is disposed between the terminal B4 and the terminal GND. An operating state detection circuit 128D that detects the operating state of the balancing switch 129D is connected in parallel to the balancing switch 129D. The discharge control circuit 132 executes open/close control for the balancing switch 129D.

The operating state detection circuits 128A to 128D repeatedly detect the voltages at the two terminals at the respective balancing switches 129A to 129D over predetermined cycles so as to determine whether or not the balancing switches 129A to 129D are in a normal state. The states of charge of the cells BC1 to BC4 are adjusted via the balancing switches 129A to 129D respectively. This means that if an abnormality occurs at any of these switches, the state of charge of the corresponding cell cannot be controlled, giving rise to an over-charge or an over-discharged state in the particular cell. Any one of the balancing switches 129A to 129D may be detected to be in an abnormal state if for instance, the voltage between the terminals at the balancing switch, which should be in a conductive state, matches the terminal voltage at the corresponding cell. Under such circumstances, the balancing switch has failed to enter the conductive state in response to a control signal. Also, if the voltage between the terminals at a given balancing switch, which should be in an open state, indicates a value lower than that of the terminal voltage at the corresponding cell, the particular balancing switch can be assumed to be conductive regardless of the control signal. The switch operating state detection circuits 128A to 128D may be voltage detection circuits each constituted with a differential amplifier or the like. The terminal voltages are compared with a predetermined voltage used for purposes of making the decision described above at an abnormality decision-making circuit 131 to be detailed later.

Via the balancing switches 129A to 129D, which may each be constituted with, for instance, a MOSFET, the power having accumulated in the corresponding cells BC1 to BC4 is discharged. An electrical load such as an inverter is connected to the battery modules 6 and 8 constituted with numerous serially connected cells and an electrical current is supplied to the electrical load from the entire assembly of serially connected cells. In addition, the battery modules 6 and 8 are charged with an electrical current supplied from the electrical load to all the cells connected in series. If the serially connected cells assume varying states of charge (SOCs), the current supplied to the electrical load is regulated in correspondence to the state of the cell at the most advanced stage of discharge among the cells. The current supplied from the electrical load, on the other hand, is regulated in correspondence to the state of the cell at the most advanced stage of charge among the cells.

The balancing switch 129 connected to any cell assuming a state of charge exceeding the average state among the numerous serially connected cells is set in a conductive state so as to supply a discharge current via the serially connected resistors. As a result, the states of charge of the serially connected cells are controlled toward equalization. An alternative method whereby the cell in the most advanced stage of discharge is assigned as a reference cell and the discharge time for a given cell is determined based upon the difference relative to the state of charge of the reference cell may be adopted. There are various other methods that may be adopted for state of charge adjustment. The state of charge of each cell can be determined through arithmetic operation executed based upon the terminal voltage at the cell. There is a correlation between the state of charge of the cell and the terminal voltage at the cell and, accordingly, by controlling the balancing switches 129 so as to equalize the terminal voltages at the cells, the states of charge of the cells can be substantially equalized.

The voltage between the source and the drain at the FET constituting each balancing switch, detected via the corresponding operating state detection circuit among the operating state detection circuits 128A to 128D, is output to a potential conversion circuit 130. Different potentials are set between the sources and the drains at the individual FETs relative to the reference potential at the integrated circuit 3A, and for this reason, accurate judgment cannot be made by comparing the initial voltage values. Accordingly, the potentials are adjusted at the potential conversion circuit 130 before undergoing abnormality decision-making at the abnormality decision-making circuit 131. The potential conversion circuit 130 also has a function of selecting the diagnosis target balancing switch 129 based upon a control signal provided from the IC control circuit 123. The voltage at the selected balancing switch 129 is provided to the abnormality decision-making circuit 131. Based upon a control signal provided from the IC control circuit 123, the abnormality decision-making circuit 131 compares the voltage measured between the terminals at the diagnosis target balancing switch 129, indicated in the signal from the potential conversion circuit 130, with a decision-making voltage and makes a decision as to whether or not an abnormality has occurred at the target balancing switch among the balancing switches 129A to 129D.

A command signal for setting the balancing switch 129, corresponding to the cell to be discharged, in a conductive state is transmitted from the IC control circuit 123 to the discharge control circuit 132. Based upon this command signal, a signal equivalent to a gate voltage at which the balancing switches 129A to 129D, constituted with MOSFETs as explained earlier, enter the continuous state is output from the discharge control circuit 132. The IC control circuit 123, upon receiving through communication a discharge time command indicating the discharge time corresponding to the specific cell from the BCU 1 in FIG. 1, executes the discharge operation described above.

The abnormality decision-making circuit 131 detects whether or not an abnormality has occurred at any of the balancing switches 129A to 129D.

The IC control circuit 123 outputs an abnormality signal indicating that an abnormality has occurred at any of the balancing switches 129A to 129D from the one-bit transmission terminal FFO of the communication circuit 127 and the abnormality signal is subsequently transmitted to the BCU 1 via the communication circuits 127 at the other integrated circuits. In addition, the IC control circuit 123 transmits information indicating that an abnormality has occurred at a balancing switch among the balancing switches 129A to 129D and information enabling identification of the abnormal balancing switch to the BCU 1 via the transmission terminal TX at the communication circuit 127.

(Diagnosis and Measurement: Terminal Voltage Measurement at Cells)

Figure 5:
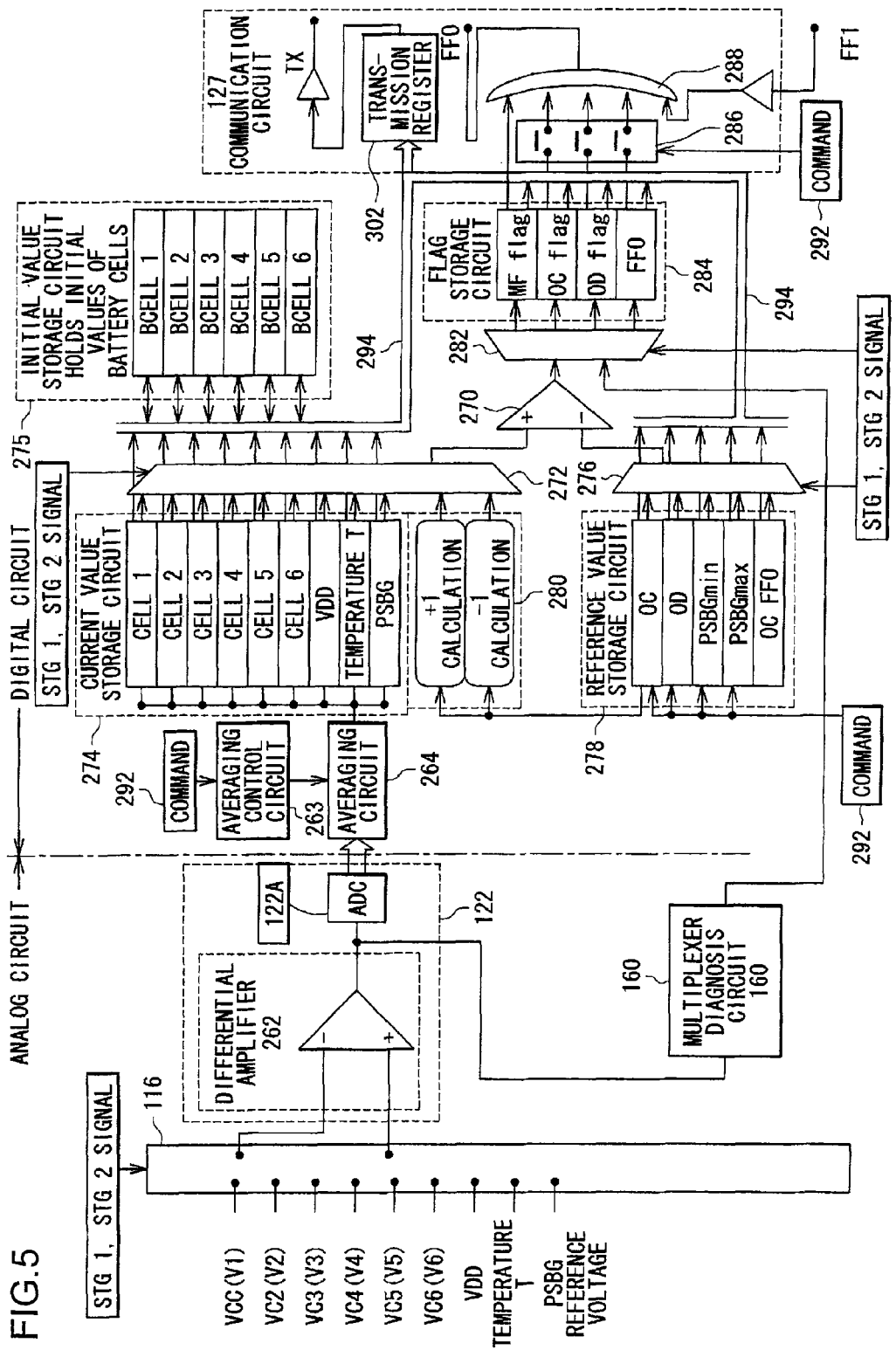
FIG. 5 is a diagram explaining a circuit related to a diagnosis operation and a measurement operation.

FIG. 5 shows the measurement circuit and the diagnosis circuit. The input circuit 116 functions as a multiplexer. Control signals (timing signals) STG1 and STG2 are input from a decoder of a timing control circuit 252 to the input circuit 116, and, based upon the signals, a selection operation is executed by the multiplexer. A multiplexer diagnosis is executed by taking an output signal from a differential amplifier 262 of the voltage detection circuit 122 in a diagnosis circuit 160. In addition, in the event that, for example, the voltage at the cell BC1 is measured, the voltage at the cell BC1 is output from the input circuit 116 to the voltage detection circuit 122 when the terminal V1 and the terminal V2 are selected. Terminal voltage measurement at a cell will now be explained.

The voltage detection circuit 122 includes a differential amplifier 262 and the analog/digital converter 122A. It is to be noted that since the cells BC1 to BC4 are connected in series, negative-pole potentials are different at each terminal voltage. Therefore, the differential amplifier 262 is used so as to adjust the reference potentials (GND potentials at each of the integrated circuits IC). The output from the differential amplifier 262 is digitized by the analog/digital converter 122A and the digitized output is then input to an averaging circuit 264. The averaging circuit 264 determines the average value of the values indicated in the results of a predetermined number of measurements. In the event that the average value has been determined in correspondence to the cell BC1, it is held at a register CELL 1 in the current value storage circuit 274. The averaging circuit 264 calculates the average value of the values obtained through the number of measurements indicated at an averaging control circuit 263 and the average value output from the averaging circuit is held at the current value storage circuit 274 mentioned earlier. If the averaging control circuit 263 indicates 1, the output from the analog/digital converter 122A is directly held at the register CELL 1 in the current value storage circuit 274 without undergoing averaging operation. If, on the other hand, the averaging control circuit 263 indicates 4, the values indicated in the results of the four measurements of the terminal voltage at the cell BC1 are averaged and the average value is held at the register CELL 1 in the current value storage circuit 274. While four measurements need to be executed initially at the corresponding stages shown in FIG. 4 in order to calculate the average value of the four measurement values, the averaging operation at the averaging circuit 264 can be subsequently executed following each measurement session by using the four measurement values indicated in the most recent measurement results. As explained earlier, the adverse effect of noise can be eliminated via the averaging circuit 264, which calculates the average value of a predetermined number of measurement values. The DC power from the battery modules 6 and 8 shown in FIG. 1 is supplied to the inverter equipment where it is converted to AC power. As the DC power is converted to AC power at the inverter, current on/off operation is executed at high speed, generating significant noise. However, the adverse effect of such noise can be reduced by providing the averaging circuit 264.

The digital value indicating the terminal voltage at the cell BC1, resulting from the digital conversion, is held at the register CELL1 in the current value storage circuit 274. Then, a diagnosis operation is executed based upon the measurement value. During the diagnosis operation, over-charge diagnosis and over-discharge diagnosis are executed. The digital value indicating the terminal voltage at the cell BC1 is held at the register CELL1 in the current value storage circuit 274. Then, a digital multiplexer 272 reads out the terminal voltage at the cell BC1 from the register CELL1 in the current value storage circuit 274 and transmits it to a digital comparator 270. In addition, a digital multiplexer 276 reads out an over-charge decision-making reference value OC from the reference value storage circuit 278 and transmits it to the digital comparator 270. The digital comparator 270 compares the terminal voltage at the cell BC1 from the register CELL1 with the over-charge decision-making reference value OC and if the terminal voltage at the cell BC1 is greater than the over-charge decision-making reference value OC, it sets a flag (MF flag) indicating an abnormality at a flag storage circuit 284. It also sets a flag (OC flag) indicating over-charge. Occurrence of an actual over-charged state is rare since control is executed so as to prevent such an eventuality. However, the diagnosis is executed repeatedly in order to guarantee a required level of reliability.

Following the over-charge diagnosis, the over-discharge diagnosis is executed. The digital multiplexer 272 reads out the terminal voltage at the cell BC1 from the register CELL1 in the current value storage circuit 274 and transmits it to the digital comparator 270. In addition, the digital multiplexer 276 reads out an over-discharge decision-making reference value OD from the reference value storage circuit 278 and transmits it to the digital comparator 270. The digital comparator 270 compares the terminal voltage at the cell BC1 from the register CELL1 with the over-discharge decision-making reference value OD and if the terminal voltage at the cell BC1 is less than the over-discharge decision-making reference value OD, it sets a flag (MF flag) indicating an abnormality at the flag storage circuit 284. It also sets a flag (OC flag) indicating over-discharge. As in the case of over-charge diagnosis, the control is executed so as to preempt a situation in which an over-discharged state actually occurs, such an over-discharge hardly ever manifests. However, the diagnosis is executed repeatedly in order to guarantee a required level of reliability.

In the same manner, the input circuit 116 selects in sequence the terminal voltages at the cells BC2 to BC4 so that measurement of the terminal voltages and diagnoses for over-charge and over-discharge are executed.

As described earlier, the battery is used as the vehicle travels, based upon information on the state of charge, input-table/outputtable electric power, and the like from the BCU 1. The total voltage measured at the voltage sensor 10 is used to calculate the state of charge and the inputtable/outputtable electric power. It is naturally conceivable that the total voltage can be measured by adding up the voltages at each of the cells BC measured at the cell controllers 12 and 13. However, the total number of the cells BC is so numerous that it takes a long processing time to measure those voltages at each of the integrated circuits of the cell controllers 12 and 13, to transmit the measured voltages to the BCU 1 via the serial communication system 602, and to calculate the total voltage by the BCU 1, so that the voltage measurement may not follow a change in an operation state in which the drive state of the motor 230 changes rapidly.

On the other hand, the use of the voltage sensor 10 for measuring the total voltage has the advantage of being able to avoid such a problem because change in the total voltage can be obtained in real time. For this reason, the total voltage measured using a voltage sensor has been conventionally used to calculate a state of charge and calculate an inputtable/outputtable electric power.

It is to be noted that the voltage sensor 10 may be disposed between the main relays 4 and 9 and the inverter equipment 3 as shown in FIG. 1 or may be disposed between the main relays 4 and 9 and the battery modules 6 and 8. However, since the main relays 4 and 9 are in the open state as the device is stopping in the event that the voltage sensor 10 is disposed as shown in FIG. 1 of the present embodiment, leakage current at the voltage sensor 10 can be prevented while stopping without providing a leakage detection circuit, resulting in being advantageous in terms of cost.

In addition, there is an advantage that welding diagnosis of the main relay 4 can be easily executed from the voltage measured by the voltage sensor 10. For instance, if the measurement value of the voltage sensor 10 indicates voltage when only the main relay 9 on the negative side is turned on, the diagnosis result indicates that the relay on the positive side is welded. In contrast, if the measurement value of the voltage sensor 10 indicates voltage when the relay on the positive side is turned on, the diagnosis result indicates that the main relay 9 on the negative side is welded. On the other hand, in the event that the voltage sensor 10 is disposed between the main relays 4 and 9 and the battery modules 6 and 8, the above diagnosis can not be executed.

However, in the event that the voltage sensor 10 is disposed between the main relays 4 and 9 and the inverter equipment 3 as the present embodiment, there is an issue yet to be addressed effectively in that a situation in which correct voltage can not be measured by the voltage sensor 10 occurs as described earlier. This issue will now be explained with reference to FIG. 2A.

FIGS. 2A and 2B schematically illustrate changes from startup to stop of the device with respect to the state of charge calculated by the BCU 1. FIG. 2A shows a conventional case, while FIG. 2B shows the case achieved in the present embodiment. It is to be noted that the following two periods A and C are relevant now, the period from when the device is started up to when the main relay 4 is turned on (period A) and the period from when the relay is opened due to a stop signal to when the device is stopped (period C).

In FIG. 2A, being started up at a time point t0, the BCU 1 calculates voltage per cell from the voltage detected by the voltage sensor 10, and, based upon the voltage, calculates the current state of charge (SOC). For example, a correlation table between a cell voltage and the state of charge (SOC) is held so as to calculate the state of charge (SOC) from the calculated cell voltage and the correlation table. Since the charge amount at the smoothing capacitor 228 is zero from the time point t0 to a time point t1, at which the main relay 9 and the sub relay 5 are turned on and precharge is started, the voltage measured by the voltage sensor 10 is zero. Therefore, the state of charge remains zero.

When precharge is started at the time point t1, the smoothing capacitor 228 is gradually charged and the voltage at the smoothing capacitor 228, measured by the voltage sensor 10, also increases. As a result, the state of charge that is calculated based upon the voltage of the voltage sensor 10 also gradually increases over the course of time as shown in FIG. 2A.

Next, when the main relay 4 is turned on at a time point t2, the voltage measured by the voltage sensor 10 becomes equal to the total voltage at the battery modules 6 and 8. After that, when the BCU 1 receives a battery disable signal from the inverter equipment 3, the main relays 4 and 9 are opened at a time point t3 and the electric power charged at the smoothing capacitor 228 is discharged via a discharge mechanism not shown in the figure. In a period B, i.e., from the time point t2 to the time point t3, the total voltage at the battery modules 6 and 8 can be measured by the voltage sensor 10. In the period B, the state of charge changes according to the vehicle travel state.

When the relays 4 and 9 are opened at the time point t3, the power line to which the voltage sensor 10 is connected is disconnected from the battery modules 6 and 8 and, as discharge at the smoothing capacitor 228 advances, the voltage of the voltage sensor 10 is also gradually reduced. As a result, the state of charge that is calculated based upon the voltage of the voltage sensor 10 is also gradually reduced as shown in FIG. 2A and the state of charge is calculated to be zero at a time point t4 at which discharge at the smoothing capacitor 228 is completed. After that, the BCU 1 is stopped at a time point t5.

Although in the conventional case shown in FIG. 2A the state of charge that is calculated in the periods A and C has changed, the total voltage at the battery modules 6 and 8 does not change in reality. Therefore, the state of charge is supposed to be constant as shown in FIG. 2B. It is to be noted that although the state of charge changes in the strict sense because the smoothing capacitor 228 is charged in the period A, the state of charge is figured in FIG. 2B as if it is constant. Thus, in the conventional case, the voltage sensor 10 can not read the total voltage at the battery modules 6 and 8 in the state in which the relay circuits are opened (the periods A and C). Accordingly, the state of charge and the inputtable/outputtable electric power can not be calculated as well. Although in this case, conventionally, the BCU 1 often output between the time point t0 to t1 an indefinite value, a default value, or the like to the vehicle side as a state of charge or an inputtable/ outputtable electric power, the use of such value fails to accurately calculate the state of charge or the inputtable/outputtable electric power.

After that, since the voltage at the smoothing capacitor 228 gradually increases due to precharge, the state of charge and the inputtable/outputtable electric power gradually change. There is an issue yet to be addressed effectively in that since the BCU 1 notifies this information of the vehicle side, the function of the battery can not be fully used from immediately after the vehicle started to use the battery. In addition, in the event that the relay is opened, not the voltage on the battery side but the left voltage on the inverter side is read, resulting in notification of data unrelated to the actual battery state. There is another issue yet to be addressed effectively in that since the voltage of the voltage sensor 10 is gradually reduced as shown in FIG. 2A, an abnormal state of charge or an abnormal inputtable/outputtable electric power is notified.

In the present embodiment, therefore, it is arranged that the state of charge and an inputtable/outputtable electric power are calculated using the voltage values at each of the cells BC detected by the cell controllers 12 and 13 in the periods A and C shown in FIG. 2B so as to notify the higher-order controller of a more accurate state of charge and a more inputtable/outputtable electric power regardless of the states of the main relays 4 and 9. The calculation of the state of charge in the present embodiment will now be explained with reference to FIG. 2B.

At first, operations will be explained as to the period A from when the BCU 1 is start up to when the main relays 4 and 9 are turned on. Since the main relays 4 and 9 are not set in the closed state in the period A, the total voltage at the battery modules 6 and 8 can not be detected by the voltage sensor 10. Therefore, the BCU 1 takes in the voltage values at each of the cells BC from the cell controllers 12 and 13 and calculates the total value of the voltage values taken in. The total value is the voltage corresponding to the total voltage and is divided by the total number of the cells BC so as to obtain the voltage value per cell. Then, the state of charge is calculated from the voltage value per cell and the correlation table of the voltage and the state of charge described above. In the same manner, the inputtable/outputtable electric power is calculated based upon the total value of the cell voltages.

In FIG. 2B, which schematically presents change in the state of charge, the state of the battery modules 6 and 8 is correctly reflected in the period A, so that the state of charge is constant. It is to be noted that since change in the state of charge due to precharge is neglected upon indicating, the state of charge is indicated as constant. The state of charge and the inputtable/outputtable electric power calculated in this manner are transmitted from the BCU 1 to the higher-order controller.

Next, operations will be explained as to the period B from when the main relays 4 and 9 are turned on to when they are opened. Since the total voltage at the battery modules 6 and 8 can be detected by the voltage sensor 10 in the period B, the voltage value per cell is obtained from the voltage value of the voltage sensor 10 so as to calculate the state of charge and the like.

Since the total voltage at the battery modules 6 and 8 can not be detected by the voltage sensor 10 in the period C from when the main relays 4 and 9 are opened to when the BCU 1 is stopped, the state of charge and the inputtable/outputtable electric power are obtained in the same manner as in the period A. Therefore, the state of charge is accurately calculated in the period C, so that the state of charge becomes constant as shown in FIG. 2B.

In order to modify the calculation method of the state of charge according to the period, the operation mode for calculation of the state of charge at the BCU 1 may be switched using a control signal or a control instruction of the relays. FIG. 3 is a flowchart explaining a mode switching operation.

When the BCU 1 is started up, the operation mode is set to a mode A in a step S100. The mode A is an operation mode in the period A described above. In the same manner, modes in the periods B and C are referred to as a mode B and a mode C, respectively. In a step S110, a decision is made as to whether or not the relay has been turned on, i.e., whether or not a control signal that turns on the main relay 4 after precharge has been sent out. If the result of the decision is YES in the step S110, the flow of control proceeds to a step S120, in which the operation mode is set to the mode B. In a step S130, a decision is made as to whether or not the relay has been opened. If the result of the decision is YES in the step S130, the flow of control proceeds to a step S140, in which the operation mode is set to the mode C.

Thus, in the present embodiment, the state of charge and the inputtable/outputtable electric power can be accurately notified regardless of the state of the main relays 4 and 9 by switching the calculation operation for the state of charge and the inputtable/outputtable electric power as described above in the three periods A, B, and C, which are before the main relays 4 and 9 are turned on, after the main relays 4 and 9 are turned on, and while the main relays are opened, respectively.

By this means, the battery state can be accurately calculated even if the main relays 4 and 9 (contactors) are in the open state, thereby assuring improved reliability in the vehicle battery control system.

It is to be noted that it may be arranged that any one of each of the cell voltages, the total value of the cell voltages, and the total voltage detected by the voltage sensor 10 is stored in a nonvolatile memory 15 (refer to FIG. 1) as the BCU 1 is stopped, and, until the voltages at each of the cells are collected at the next startup, the state of charge and the inputtable/outputtable electric power are calculated based upon the voltage data stored in the nonvolatile memory 15. This causes the vehicle side to obtain highly reliable battery information from the startup. For instance, it is effective in a re-startup during idle reduction.

The embodiments described above may be adopted by themselves or in combination. The advantages of the individual embodiments may be realized independently of one another or synergistically through combination thereof. In addition, the present invention may be embodied in any way other than those described in reference to the embodiments, as long as the features characterizing the present invention remain intact.

What is claimed is:

1. A vehicle battery control system, comprising:
a battery module that is constituted with a plurality of cells that are electrically connected in series and is connected to an inverter equipment via a contactor;
a cell controller that detects each voltage at the plurality of cells; and
a voltage sensor that measures a voltage between a positive pole and a negative pole between the contactor and the inverter equipment;
a battery control unit that calculates a battery state and/or an inputtable/outputtable electric power of the battery module and outputs the calculated the battery state and/or the inputtable/outputtable electric power to a higher-order controller, wherein:
the contactor includes a main contactor and a sub contactor;

a first, a second and a third modes are defined as modes where the battery control unit calculates the battery state and/or the inputtable/outputtable electric power; and outputs the calculated battery state and/or the inputtable/outputtable electric power to the higher-order controller;

the battery control unit switches a mode among the first through the third modes and calculates the battery state and/or the inputtable/outputtable electric power and outputs the calculated the battery state and/or the inputtable/outputtable electric power to the higher-order controller according to a switched mode;

when the first mode, where the battery control unit is started up and the main contactor is in an open state, is set, the battery control unit determines a total voltage of the battery module with a total value of voltages at the plurality of cells detected by the cell controller, calculates the battery state and/or the inputtable/outputtable electric power based upon the total voltage, and outputs the calculated battery state and/or the inputtable/outputtable electric power to the higher-order controller;

when the second mode, where the main contactor is in a closed state, is set, the battery control unit determines the total voltage of the battery module with the voltage measured by the voltage sensor, calculates the battery state and/or the inputtable/outputtable electric power based upon the total voltage, and outputs the calculated battery state and/or the inputtable/outputtable electric power to the higher-order controller; and when the third mode, where the main contactor changes from a closed state to an open state and the battery control unit is stopped, is set, the battery control unit determines the total voltage of the battery module with the total value of voltages at the plurality of cells detected by the cell controller, calculates the battery state and/or the inputtable/outputtable electric power based upon the total voltage, and outputs the calculated battery state and/or the inputtable/outputtable electric power to the higher-order controller.

2. A vehicle battery control system according to claim 1, wherein:

the inverter equipment includes a smoothing capacitor that is connected in parallel with input terminals; and a preliminary charge period of the smoothing capacitor is included in a period of the open state.

3. A vehicle battery control system according to claim 2, further comprising:

a storage device that stores the voltages of the cells detected by the cell controller or the total value of the voltages of the cells just before the contactor is closed when the vehicle battery control system is stopped, wherein:

the battery control unit calculates the battery state based upon the voltages or the total values of the voltages stored in the storage device when the vehicle battery control system is started up.

4. A vehicle battery control system according to claim 1, further comprising:

a storage device that stores the voltages of the cells detected by the cell controller or the total value of the voltages of the cells just before the contactor is closed when the vehicle battery control system is stopped, wherein:

the battery control unit calculates the battery state based upon the voltages or the total values of the voltages stored in the storage device when the vehicle battery control system is started up.

* * * * *